United States Patent [19]
Jones

[11] 4,228,906
[45] Oct. 21, 1980

[54] ADJUSTABLE RAIL MOUNTING ASSEMBLY

[75] Inventor: Dennis L. Jones, Bakersfield, Calif.

[73] Assignee: Kardex Systems, Inc., Marietta, Ohio

[21] Appl. No.: 942,911

[22] Filed: Sep. 14, 1978

[51] Int. Cl.³ .............................................. A47F 5/00
[52] U.S. Cl. .................................. 211/126; 211/192; 248/222.1; 403/254
[58] Field of Search .................. 211/71, 208, 88, 191, 211/103, 192, 126, 94, 162; 248/223.3, 243, 224.4, 223 A, 226.4, 222.1; 403/254, 230, 388; 108/111

[56] References Cited

U.S. PATENT DOCUMENTS

| | | | |
|---|---|---|---|
| 3,031,088 | 4/1962 | Ribbens et al. | 211/208 |
| 3,726,411 | 4/1973 | Jones | 211/126 |
| 3,881,829 | 5/1975 | James | 211/192 X |
| 4,053,245 | 10/1977 | Wright | 211/191 X |
| 4,129,279 | 12/1978 | Borkholder | 211/192 X |

FOREIGN PATENT DOCUMENTS

| | | | |
|---|---|---|---|
| 623231 | 10/1962 | Belgium | 211/193 |
| 651852 | 11/1962 | Canada | 211/191 |
| 660875 | 4/1963 | Canada | 211/126 |

*Primary Examiner*—Roy D. Frazier
*Assistant Examiner*—Robert W. Gibson, Jr.
*Attorney, Agent, or Firm*—Clarence A. O'Brien; Harvey B. Jacobson

[57] ABSTRACT

An upright adjustable rail mounting assembly for adjustably attaching horizontally mounting rails to a pair of slotted uprights by use of an adjustable locking bracket. The rail flanges facilitate mounting of a container assembly provided with means for engagement with the rails. The bracket and rail mounting assembly permit fractional adjustment vertically, and the locking bracket is removable for compact shipping. An alternative locking bracket has a bend to prevent angular disorientation of the bracket with respect to the mounting rail.

10 Claims, 8 Drawing Figures

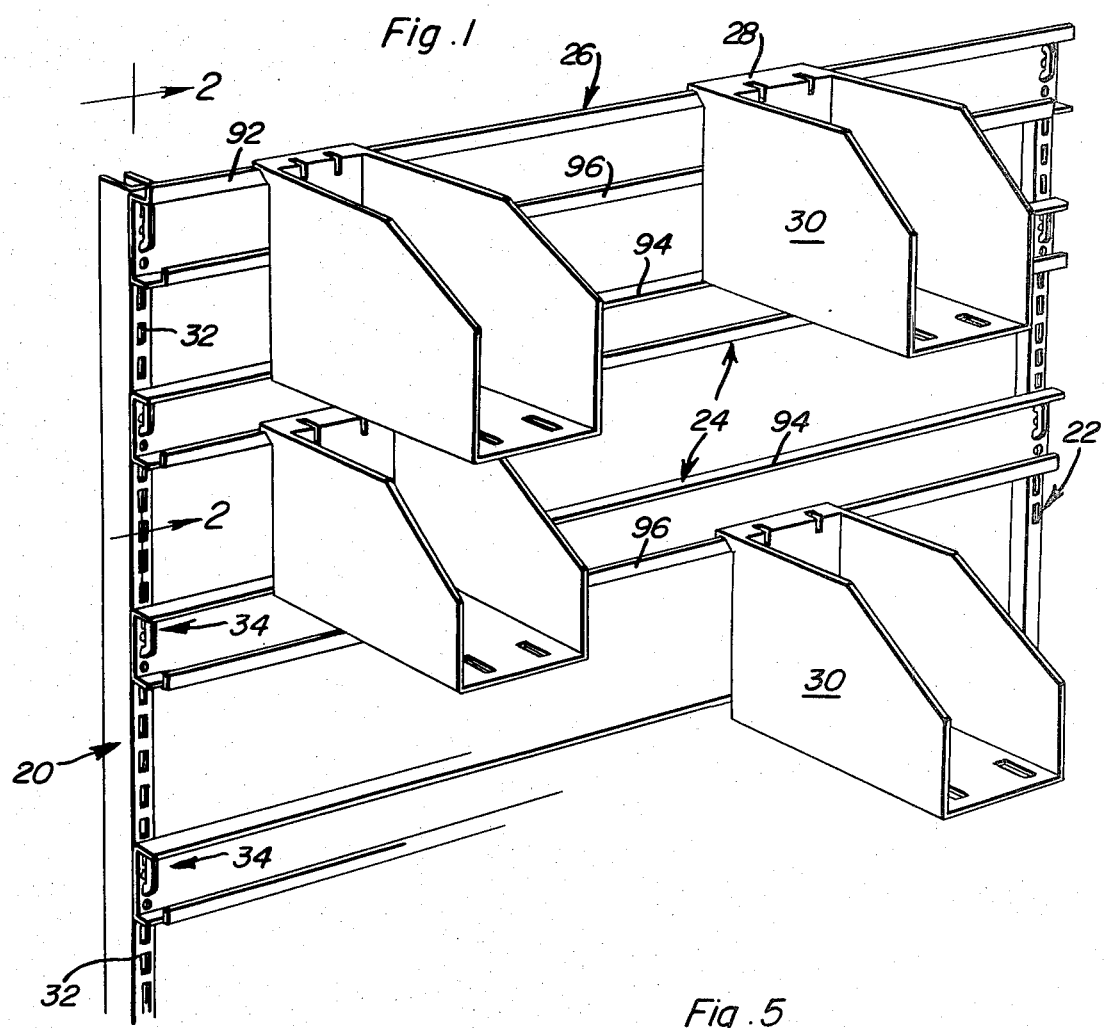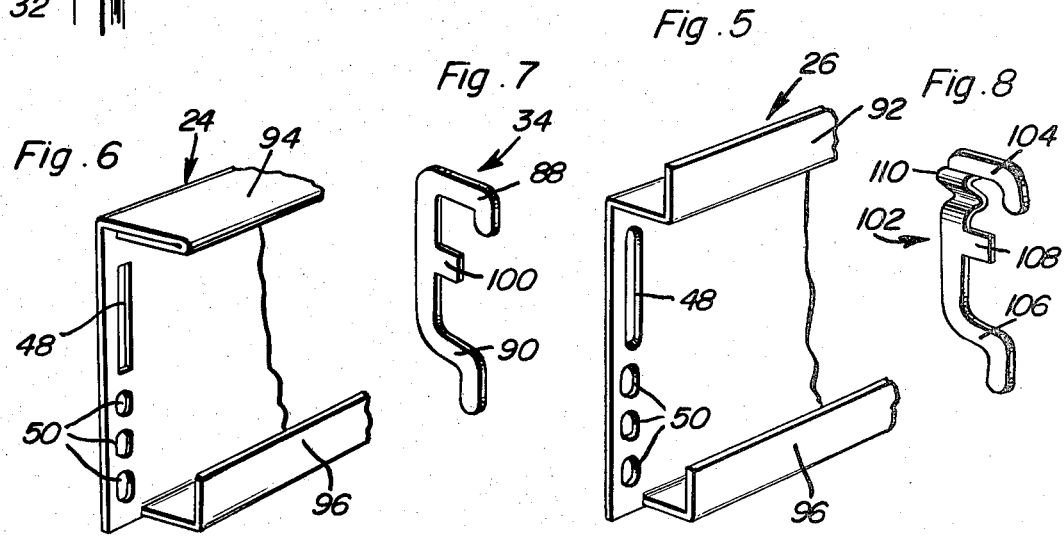

ADJUSTABLE RAIL MOUNTING ASSEMBLY

BACKGROUND OF THE INVENTION

1. Field of the Invention

The invention relates to a rail mounting assembly such as can be used for supporting storage containers or bins. More particularly, the rail mounting assembly is made up of horizontal rails held on a plurality of fixed uprights by adjustable locking brackets constructed for fractional spacing vertically. The horizontal rails are provided with suitable flanges for engaging hooks on the storage containers, or for resting of the lower portion of storage containers thereon. Holes and slots are provided at fastening points along the rail to accommodate the adjustable locking bracket, which then passes through slots on the upright support post to provide two downward bearing points in support of the rail upon the upright support post.

2. Description of the Prior Art

A suspension framework for support of storage bins with rearwardly extending hooks punched out from horizontal suspension rails is shown in U.S. Pat. No. 3,067,882, issued Dec. 11, 1972 to Ribbens et al. Dethardt et al in U.S. Pat. No. 3,033,378, issued May 8, 1962, shows a collapsible file holder and teaches welding, bolting or otherwise securing horizontal rails to upright posts. In U.S. Pat. No. 3,726,411, issued Apr. 10, 1973 to Jones, a shelf mountable container assembly is provided where a fixed mounting flange engages a hook on the container. A safety hook for assembly of rails and supporting poles to form a rack is shown in U.S. Pat. No. 3,490,604, issued Jan. 20, 1970 to Klein, and another connecting hook is shown in U.S. Pat. No. 3,637,086, issued Jan. 25, 1972 to Klein. U.S. Pat. No. 2,778,505, issued Jan. 22, 1957 to Levitt et al, discloses a shelf supporting bracket to hook into two slots of a pillar. U.S. Pat. No. 3,352,584, issued Nov. 14, 1967 to Engel and U.S. Pat. No. 3,627,247, issued Dec. 14, 1971 to Krikorian, show brackets for holding bins or pallet racks to slotted upright posts.

Other patents disclosing various other means for supporting shelving rack assemblies are the following:

| | | |
|---|---|---|
| 2,895,619 | Frazier | July 21, 1959 |
| 2,974,807 | Furrer | March 14, 1961 |
| 3,031,088 | Ribbens et al | April 24, 1962 |
| 3,291,319 | Novales et al | December 13, 1966 |

None of the prior art patents discloses a means for fractional spacing between upright support post slots, and none of the patents disclosed has a locking bracket with three projections or hooks for engagement of a support post by a horizontal rail. Consequently, all prior art devices suffer the drawback of requiring lifting of the rail the full space between slots in a mounting upright post for vertical adjustment of position. Moreover, attainment of fractional spacing with prior art hooks has required maintenance of a sizable inventory of various styles of hooking combinations. Other prior art rails have a fixed hook to mount through holes in the uprights, such fixed hooks tending to be easily bent in shipping and being less compact in shipping size due to the fact that such fixed hooks do not intermember easily. Furthermore, prior art rails fail to provide a reinforced top flange and therefore suffered from deformability on application of loads such as by resting thereon of storage containers or bins containing heavy loads such as metal parts, pipe fittings, or the like.

SUMMARY OF THE INVENTION

Accordingly, it is an object of the present invention to provide a rail mounting assembly for fractionally adjustable spacing of a horizontal rail in a vertical direction.

Another object of the invention is to provide an adjustable locking bracket for securely and removably attaching the rail to a slotted upright support post.

Still another object of the invention is to provide an adjustable locking bracket for fractional vertical adjustment where two downward bearing points are at all times available for support of the horizontal rail on the vertical slotted upright bracket.

A further object of the invention is to reduce the inventory of hooking combinations required for mounting rails to upright support posts.

Yet a further object of the invention is to provide a rail mounting assembly which is sturdy, rugged, and compact for safe and reliable shipment by standard means.

Still a further object of the invention is to provide a reinforced top flange for a rail mount having greater strength for support of loads in containers mounted or resting thereon.

Yet another object is to provide an adjustable locking bracket having an S-shaped bend to prevent the bracket from substantial angular deviation when placed through the rail and inserted through the upright support post.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of an assembly of upright posts, rails mounted thereon, and storage containers mounted on the rail mounting assembly.

FIG. 5 is a perspective view of the first embodiment of adjustable rail, and FIG. 6 is a perspective view of the second embodiment of adjustable rail.

FIG. 7 is a perspective view of an adjustable bracket.

FIG. 8 is a perspective view of a locking bracket having bends forming an S-shaped upper portion to reduce angular disorientation.

DESCRIPTION OF THE PREFERRED EMBODIMENT

Figure 2:
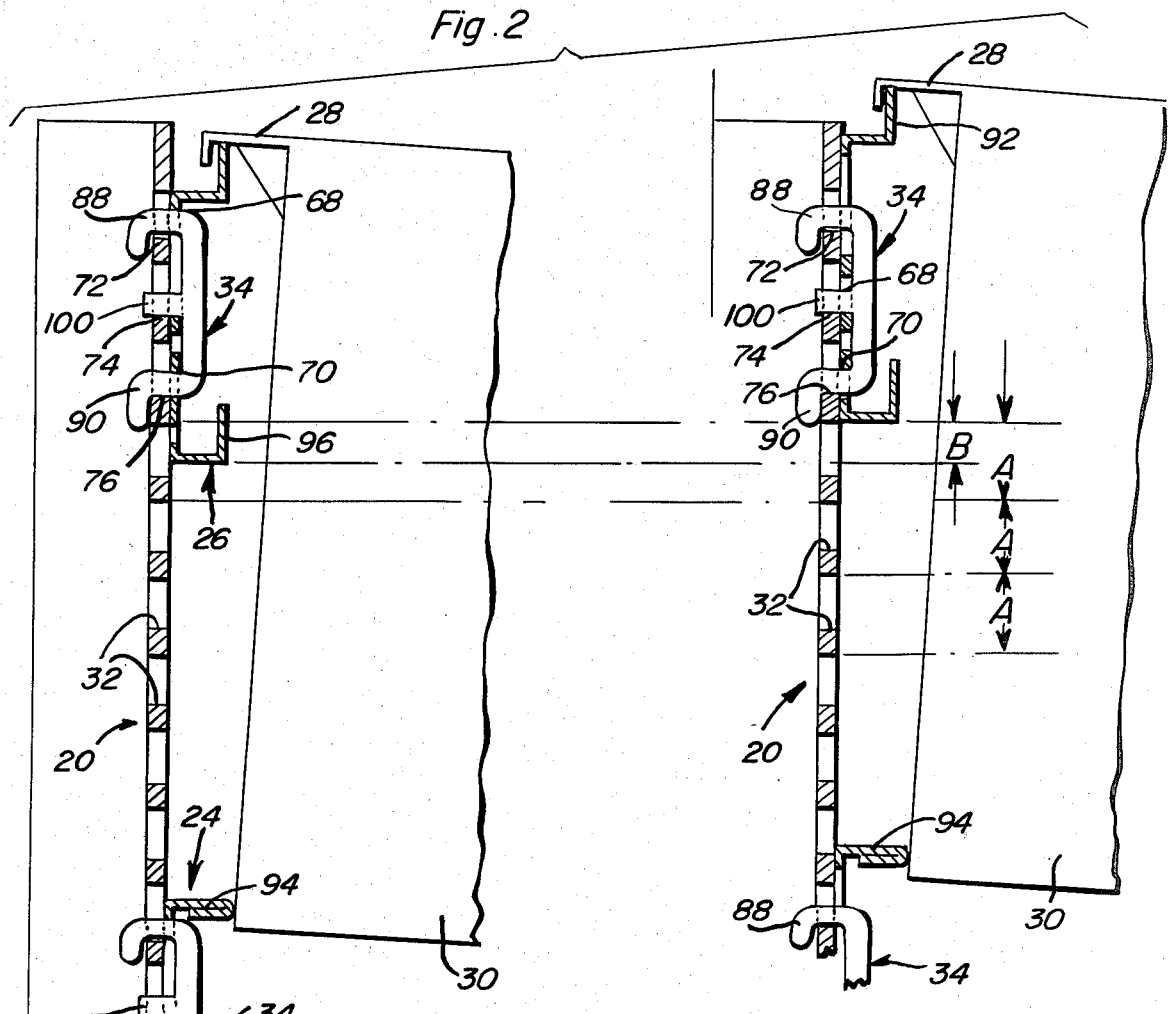
FIG. 2 is a vertical sectional view illustrating fractional vertical adjustment of the rail by showing two fractionally adjusted positions of the assembly.

In FIG. 1, slotted upright posts 20 and 22 support horizontal rails 24, having a reinforced top flange 94, and rail 26, having an outwardly and upwardly extending upper flange 92 for engaging container hooks 28 on storage containers 30. Slotted upright posts 20 and 22 have rectangular slots 32 in which hooks from adjustable locking brackets 34 can be inserted.

Figure 3:
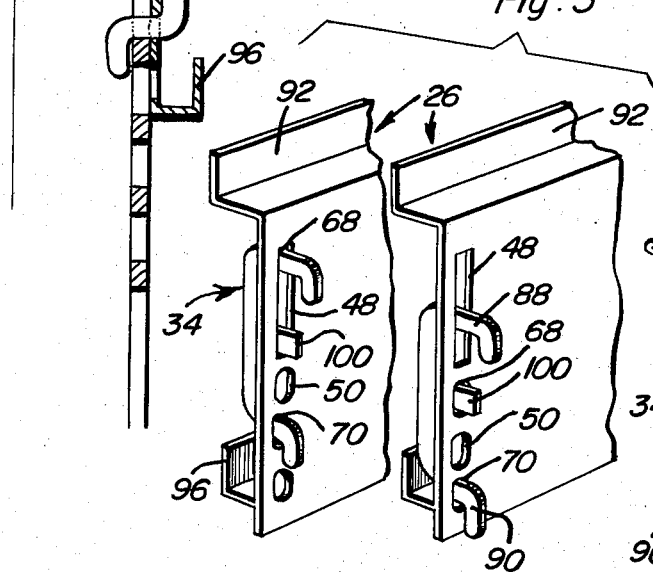
FIG. 3 is a group perspective view of one embodiment of adjustable rail, showing a locking support bracket in each of two positions for fractional adjustment of the vertical height of the mounting rail.
Figure 4:
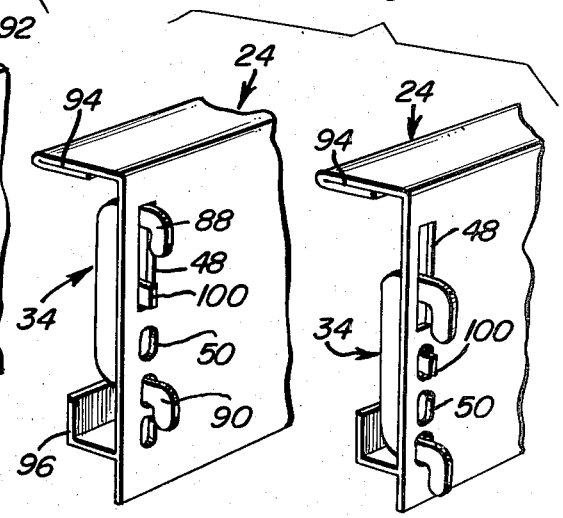
FIG. 4 is a group perspective view of a second embodiment of adjustable rail with a reinforced upper flange, showing a locking support bracket in each of two positions for fractional adjustment of the vertical height of mounting of the rail.

FIG. 2 shows two parallel upright support post 20 with slots 32 being spaced equally a distance designated in FIG. 2 by the letter A. Top rail 26 and intermediate rail 24 mounted respectively on slotted upright 20, illustrate the manner in which fractional spacing can be attained with use of the invention, since rails 26 and 24 differ in height by the distance designated by the letter B when in one adjusted position, which is only half the distance of A with it being pointed out that the rails can also be adjusted a full increment of distance A. The distinction between the mounting of rails 26 and 24 by locking brackets 34 is best seen in FIGS. 3 and 4, showing the two positions of bracket 34 with respect to their respective mounting rails each of which includes a slot 48 adjacent the upper edge and three equally spaced oval-shaped holes 50 below the slot 48. In FIGS. 2 and 3, it is clearly seen that the weight of the mounting rail 26 or 24 rests on bracket 34 at two points, namely, 68 and 70, while the weight of bracket 34 rests upon slotted upright 20 at three points, namely, 72, 74 and 76 with the uppermost support point 68 between the rail and bracket shifting from the hook 88 in one position to finger 100 in the other position of bracket 34 and the rail. Upper bracket hook 88 and lower bracket hook 90 of locking bracket 34 secures mounting rail 26 or 24 to upright 20.

Mounting rail 26 is also illustrated in FIG. 5, showing the top mounting rail having forwardly offset top flange 92 extending outwardly and upwardly. The intermediate mounting rail 24 is shown in FIG. 6, having a double reinforced upper flange 94 which extends outwardly and is bent back upon itself. Reinforced upper flange 94 is used to support the bottom portion of a storage container, such as container 30 illustrated in FIGS. 1 and 2. Both embodiments of mounting rail, namely rails 26 and 24, have a lower flange 96, extending outwardly and upwardly. Flanges 92 and 96 are constructed to engage a hook provided on storage containers, such as container hook 28 provided on storage container 30 illustrated in FIGS. 1 and 2.

FIGS. 7 and 8 illustrate two embodiments of adjustable locking bracket, FIG. 7 showing the adjustable locking bracket 34 which has been illustrated in the discussion of FIGS. 1–4. Bracket 34 has upper bracket hook 88, lower bracket hook 90, and horizontal finger 100 for securing a mounting rail of either embodiment illustrated in FIGS. 5 and 6 to a slotted upright post, such as post 20 illustrated in FIG. 2 with the finger 100 in the uppermost hole 50 in one adjusted position and in slot 48 when in the fractionally adjusted position. At least two downward bearing points to support a rail to the bracket are present in either of the mounting configurations, as discussed above in connection with FIG. 2. In FIG. 8, an alternative construction of adjustable locking bracket 102 is shown. Bracket 102 has upper bracket hook 104, lower bracket hook 106, and horizontal finger 108 in precisely the same relative configuration as the corresponding parts of bracket 34, but bracket 102 is provided with an S-shaped bend 110 in the region between upper bracket hook 104 and horizontal finger 108 in order to prevent or substantially reduce angular deviation of bracket 102 when placed through a mounting rail, such as rail 26, and inserted into a slotted upright post, such as post 20. The outer curves of bend 110 preserve the bracket in a substantially perpendicular relation to the mounting rail. Although it is preferred to provide the S-shaped bend 110 in the location shown in FIG. 8, namely, between upper bracket hook 104 and horizontal finger 108, it is possible to provide the S-shaped bend in the region between horizontal finger 108 and lower bracket hook 106, or, alternatively, to provide two S-shaped bends in each position. In order to preserve interchangeability between any brackets having one or more S-shaped bends with brackets such as bracket 34 which are substantially planar, it is critical to preserve the relative positions of upper bracket hook, lower bracket hook, and horizontal finger.

In both embodiments of the bracket, it is inserted from the bottom by inserting the end of hook 90 or 106 through the appropriate hole 50 in the rail and rocked upwardly toward the rail to insert the finger 100 or 108 through either a hole 50 or slot 48 and upper hook 88 through slot 48 and through the slots in the post 20 to interlock therewith.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An adjustable mounting assembly comprising, in combination, a slotted upright support post, a slotted, substantially horizontal mounting rail for attachment to said post and support of storage containers thereon, and attaching means for removably securing said mounting rail to said post, said attaching means comprising an adjustable locking bracket for insertion through said slotted mounting rail and through said slotted upright support post, said slotted post including equally spaced vertical slots of equal dimension, said rail including a vertical slot and a plurality of vertically spaced holes aligned with the slot, said bracket including a vertical member having three laterally extending fingers thereon with the upper and lower fingers being hook-shaped to extend through the rail and post and interlock therewith to secure the rail to the post, the dimensions and spacing of the post slots, slot and holes in the rail and the fingers on the bracket being such that the rail can be attached to the post in adjusted position fractionally of the vertical distance between the post slots as well as adjusted positions coinciding with the vertical distance between the post slots.

2. The assembly of claim 1 wherein said mounting rail has an outwardly and upwardly extending engageable lower flange for engaging hook means on a storage container.

3. The assembly of claim 2 wherein said mounting rail has an outwardly and upwardly extending engageable upper flange for engaging hook means on a storage container.

4. The assembly of claim 2 wherein said mounting rail has an outwardly extending reinforced upper flange for lateral support of a storage container.

5. The assembly of claim 2 wherein said mounting rail has an elongated vertical slot below which are disposed in substantially equally spaced collinear relation at least three mounting holes, and said adjustable locking bracket has a lower bracket hook adapted to fit within one of said mounting holes, an upper bracket hook adapted to fit within said elongated slot, and a horizontal finger disposed between said upper bracket hook and said lower bracket hook and adapted to fit within one of said mounting holes or said elongated slot.

6. The assembly of claim 5 wherein said adjustable locking bracket has a bend between said upper bracket hook and said horizontal finger whereby substantial angular disorientation is prevented when said bracket supports said mounting rail on said upright support post.

7. The assembly of claim 5 wherein said mounting holes comprise an upper mounting hole, a middle mounting hole, and a lower mounting hole, and said lower bracket hook passes through said middle mounting hole and said horizontal finger and said upper bracket hook pass through said elongated slot to support the rail in one adjusted position.

8. The assembly of claim 5 wherein said mounting holes comprise an upper mounting hole, a middle mounting hole, and a lower mounting hole, and said lower bracket hook passes through said lower mounting hole, said horizontal finger passes through said upper mounting hole and said upper bracket hook passes through said elongated slot of said mounting rail to support the rail in another adjusted position.

9. The assembly of claim 1 wherein said adjustable locking bracket is provided with a bend to prevent substantial angular disorientation of said locking bracket with respect to said mounting rail.

10. The assembly of claim 9 wherein said bracket is provided with a plurality of bends so as to impart an S-shaped configuration to said bracket.

* * * * *